United States Patent
Clarke et al.

(10) Patent No.: US 7,184,151 B2
(45) Date of Patent: Feb. 27, 2007

(54) METHOD FOR IDENTIFYING MEASURING POINTS IN AN OPTICAL MEASURING SYSTEM

(75) Inventors: Timothy Alan Clarke, Hertfordshire (GB); Xinchi Wang, Hertfordshire (GB)

(73) Assignee: Leica Geosystems AG (CH)

( * ) Notice: Subject to any disclaimer, the term of this patent is extended or adjusted under 35 U.S.C. 154(b) by 352 days.

(21) Appl. No.: 10/363,873

(22) PCT Filed: Sep. 6, 2001

(86) PCT No.: PCT/CH01/00539

§ 371 (c)(1),
(2), (4) Date: Jun. 12, 2003

(87) PCT Pub. No.: WO02/23127

PCT Pub. Date: Mar. 21, 2002

(65) Prior Publication Data

US 2004/0027589 A1 Feb. 12, 2004

(30) Foreign Application Priority Data

Sep. 11, 2000 (EP) .................................. 00810817

(51) Int. Cl.
*G01B 11/14* (2006.01)
(52) U.S. Cl. ....................................... 356/620; 356/614
(58) Field of Classification Search ................ 356/614, 356/616, 617, 620, 622, 373, 141; 382/170, 382/174; 250/231.13, 231.14, 231.17, 226.1, 250/206.2

See application file for complete search history.

(56) References Cited

U.S. PATENT DOCUMENTS

| | | | | |
|---|---|---|---|---|
| 4,764,668 A | * | 8/1988 | Hayard | 235/470 |
| 4,813,436 A | * | 3/1989 | Au | 600/592 |
| 4,863,819 A | | 9/1989 | Drexler et al. | |
| 5,072,294 A | * | 12/1991 | Engle | 348/172 |
| 5,260,556 A | * | 11/1993 | Lake et al. | 235/494 |
| 5,393,970 A | * | 2/1995 | Shau et al. | 250/206.2 |
| 5,395,181 A | * | 3/1995 | Dezse et al. | 400/103 |
| 5,457,754 A | * | 10/1995 | Han et al. | 382/128 |
| 5,689,340 A | * | 11/1997 | Young | 356/401 |
| 5,724,743 A | * | 3/1998 | Jackson | 33/288 |
| 5,734,736 A | * | 3/1998 | Palmer et al. | 382/103 |

(Continued)

FOREIGN PATENT DOCUMENTS

| | | |
|---|---|---|
| DE | 196 32 058 C1 | 3/1998 |
| DE | 197 33 466 A1 | 2/1999 |

*Primary Examiner*—Michael P. Stafira
(74) *Attorney, Agent, or Firm*—Rankin, Hill, Porter & Clark LLP

(57) ABSTRACT

In an optical measuring system for determining spatial position and orientation of objects, a plurality of measuring points on the object is registered by cameras, laser measuring devices or a combination thereof. For identifying the measuring points, one target of a specific intensity and/or size or a predetermined pattern (3) of a plurality of targets (4) having specific differing intensities and/or sizes is associated with each measuring point. The intensities and/or sizes of the targets are detected in a pixel image of the target (4) by summing up intensities sensed by pixels included in the image of the target. The targets are light emitting devices consuming differing amounts of energy, reflecting, black or white spots of differing diameter or spots of differing shades of gray or other suitable color.

11 Claims, 2 Drawing Sheets

U.S. PATENT DOCUMENTS 5,809,171 A * 9/1998 Neff et al. .................. 382/209
5,900,930 A * 5/1999 Simon et al. ............... 356/138
5,943,783 A   8/1999 Jackson
5,973,788 A * 10/1999 Pettersen et al. ........... 356/614
5,982,352 A * 11/1999 Pryor ......................... 345/156
6,056,911 A * 5/2000 Griffin ....................... 264/346
6,064,762 A * 5/2000 Haenel ....................... 382/171

* cited by examiner

METHOD FOR IDENTIFYING MEASURING POINTS IN AN OPTICAL MEASURING SYSTEM

BACKGROUND OF THE INVENTION

1. Field of the Invention

The invention relates to the field of metrology and more particularly relates to a method for identifying measuring points in an optical measuring system in which a plurality of active or passive targets is used for marking measuring points.

2. Description of Related Art

Optical measuring systems are used for determining the position and orientation of objects in a three dimensional space, as well as for determining two dimensional deformation or three dimensional shape. For this purpose, optical measuring devices, such as cameras, laser measuring devices (e.g. laser trackers) or combinations thereof, are aimed towards the object to be measured and the spatial position of selected points (measuring points) on the object surface are registered. The data gained from such registration is then subjected to suitable computation from which data regarding the spatial position of the selected points is determined. The spatial position data of the selected points may then be used to obtain information regarding the position and orientation of the object.

The selected points on the object are usually marked with targets. These targets may be active, i.e., light emitting targets (e.g. light emitting diodes), or passive, i.e., light reflecting targets (e.g. reflectors, white spots on black background, black spots on white background or light spots projected onto the object).

As in most cases, a plurality of points is needed to get enough data for enabling computation of the desired information. It is important that registrations of measuring points can be correlated unequivocally to real measuring points. This correlation can be realized by sequential measurement of selectively illuminated targets, by image matching carried out by an operator, or by giving to each measuring point a unique, machine readable identity. Such machine readable identities may be the position of a measuring point in a predetermined geometric pattern of measuring points or it may be associated to the target marking the measuring point.

According to the state of the art, target associated identification is realized by code patterns, such as black and white patterns arranged in the vicinity of the target, and is usually decoded by template matching (image matching). Such code patterns may be circular segment codes or circular dot codes. Such codes are binary, i.e., for each code feature position, presence of the code feature (e.g. segment or dot) means "one", whereas absence of the code feature means "zero".

Such identification systems have some disadvantages. As the codes are binary, the number of permutations is relatively small, thereby necessitating large numbers of code features (segments or dots) for identifying large numbers of targets. In order to prevent misidentification, the code features must be arranged such that they can be recorded separately. Thus, large numbers of such features need a large amount of space, which restricts target density. As the code features are either present or absent, only present targets can be used for measurement. Machine reading of such identification patterns necessitates recordation and analysis of a large number of features (e.g. code segments or dots). Furthermore, decoding by template matching needs considerable computing capacity.

SUMMARY OF THE INVENTION

It is the object of the invention to provide a method for measuring point identification in an optical measurement system, wherein the method reduces the disadvantages described above for target associated identification using known patterns of code features. In particular, the inventive measuring point identification method should be universally applicable, easily adaptable for supplying, in addition to identification information, further useful information, and should be "readable" not only by template matching methods, but also by other, less computation intensive methods.

This object is achieved by the method for measuring point identification in an optical measuring system as defined by the claims.

According to the inventive method, the measuring points are marked with the aid of one or more targets each, wherein each target has a specific intensity and/or size. This means that each measuring point is identified either by intensity and/or size of a target positioned substantially in the measuring point, or by a plurality of targets arranged in a predefined pattern, wherein the pattern of targets is positioned in a predefined relation to the measuring point and encodes the identity of the measuring point by their differing intensities and/or sizes.

Targets with differing intensity may be light emitting means that emit different amounts of energy or may be passive targets having different brightness (shades of gray instead of, or in addition to, black and white, or differing intensities of specific color). Targets with differing size may be active targets consisting of an accumulation of light emitting means, or may be passive targets in the form of reflecting, or white on black, or black on white spots of differing sizes.

The targets are recorded by a pixel detector (e.g. CCD-detector) as pixel images comprising advantageously between about 10 and 100 pixels. The intensity and/or size of a target may be determined by summing up the intensities of all the pixels comprised in the pixel image of the target (showing an intensity above or below a predetermined limit). The size of a target may be determined by counting the pixels comprised in the image of the target, and the intensity may be determined by determining the intensity sensed by the one pixel of the image showing the maximum (or minimum) intensity.

In the case of a photogrammetric method, all data that needs to be recorded for determining the intensity and/or size of a target also needs to be recorded for determining the center of gravity of the image representing the exact position of the target image on the pixel detector. This means that identification is possible without additional data acquisition.

Pixel images of identification encoding patterns of a plurality of targets having differing intensities and/or sizes can also be decoded by template matching in the same way as done with images of known code patterns associated with measuring points. Identification "by hand" is possible also.

The advantages of the inventive measuring point identification method over known measuring point identification methods are, in particular, due to the fact that firstly no target needs ever to be absent (zero intensity or zero size are preferably not used) and to the fact that more than two grades of intensity and/or size are possible resulting in more than binary codes and therefore, larger numbers of permutations.

From the above short description, it can be gathered that the inventive method for target identification is very widely applicable. Each measuring point can be marked with one target of a specific intensity and/or size or by a plurality of targets arranged in a predetermined pattern, wherein each target has a specific intensity and/or size and wherein the pattern encodes the identity of the measuring point. All the targets of an encoding target pattern can represent measuring points, such that the pattern as a whole constitutes a suitable means for supplying, apart from identification information, further useful information, such as information regarding the spatial orientation of the measuring point or of the surface on which it is positioned, respectively.

BRIEF DESCRIPTION OF THE DRAWINGS

The inventive measuring point identification method is further described in connection with the following Figures, wherein.

DETAILED DESCRIPTION OF THE PREFERRED EMBODIMENTS

Figure 1:
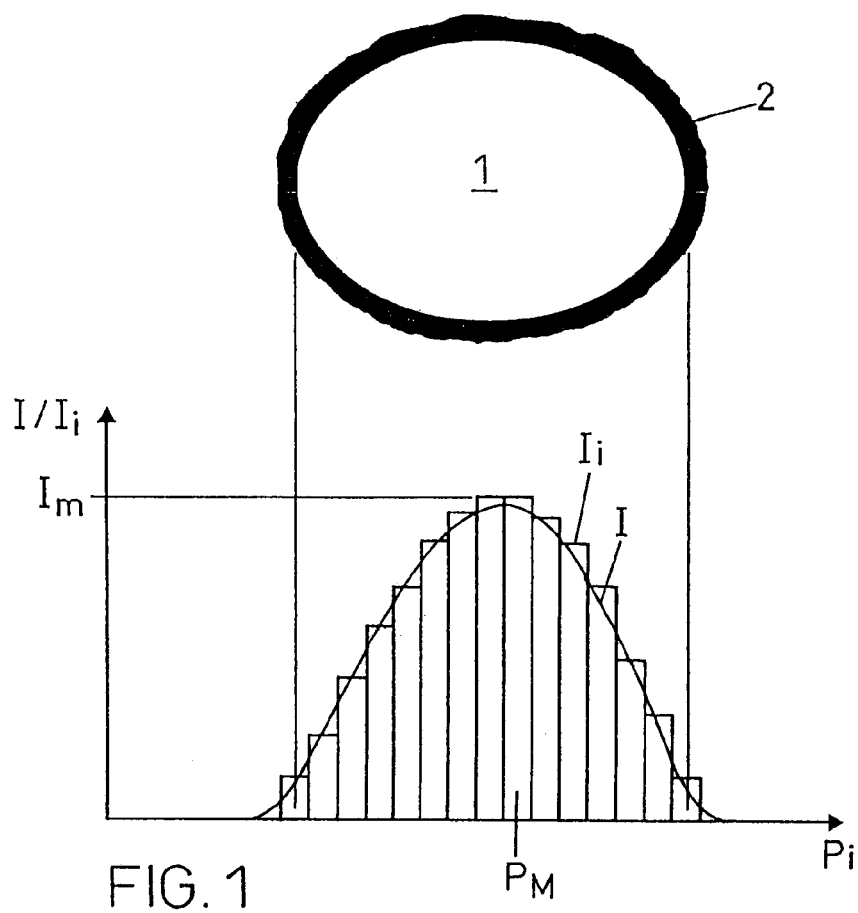
FIG. 1 illustrates the determination of intensity and/or size of a target from a pixel image of such a target.

An upper portion of FIG. 1 shows a bright spot 1 on a darker background 2 which represents the image of a target with a specific intensity and size. A lower portion of FIG. 1 shows the intensity distribution I across the image of the target and the intensities $I_i$ sensed by pixels $P_i$ of a pixel detector in the area of the target image. As mentioned above, the intensity and/or size of the image may be determined by analysis of the intensities $I_i$ of the pixels $P_i$ comprised within the spot image. For determining only size, the number of the pixels $P_i$ within the spot image can be determined. For only determining the intensity, it may be sufficient to register the maximum intensity $I_M$ sensed by pixel $P_M$.

Figure 2:
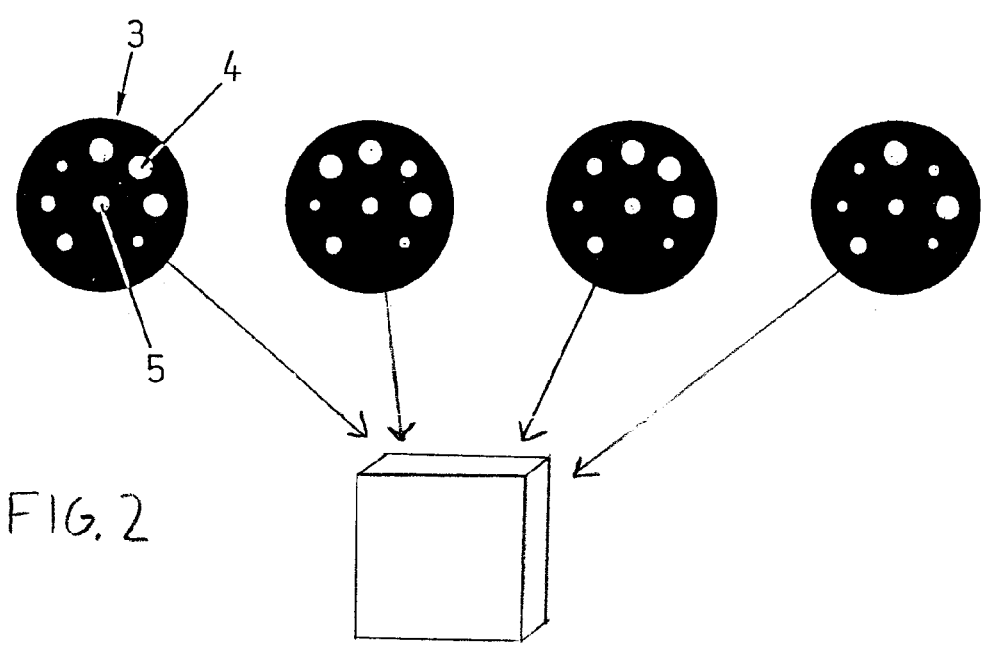
FIG. 2 shows four code patterns each comprising seven passive identification targets with differing sizes.

FIG. 2 shows four exemplified circular arrangements 3 of identification targets 4 disposed around a central target 5 marking a measuring point. The identification targets 4 have three different sizes, thereby allowing $3^7$ permutations, i.e., 2187 permutations. Without complication, the central target 5 may also be included in the identification code by having differing sizes in differing patterns 3, instead of always having the same size, as is shown in FIG. 2.

It is not necessary for the code dot patterns in a set of arrangements of such code dots to always be the same, as may be concluded from the set of arrangements shown in FIG. 2. It is quite possible that one set of arrangements comprises differing patterns.

The patterns as shown in FIG. 2 may be stickers showing the pattern in black and white, in white and black, or in suitably contrasting colors, or the code dots may be made of a reflecting material.

Figure 3:
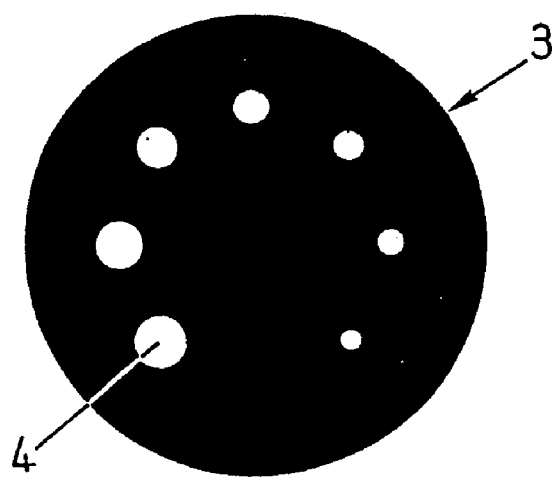
FIG. 3 shows an example of an arrangement of passive targets for encoding the identity of a measuring point and further defining the spatial position and orientation of the measuring point.

Similar to FIG. 2, FIG. 3 shows an identification pattern 3 having seven identification targets 4. In FIG. 3, however, the central target 5 marking the measuring point is missing from the identification pattern 3. In addition to being used to determine the measuring point identity, the data acquired from a pixel image of the arrangement may also be used to determine the spatial position of the arrangement center (measuring point), as well as the orientation of the arrangement (spatial orientation of the measuring point or spatial orientation of a surface on which the measuring point is positioned, respectively) if the identification targets 3 are handled like measuring point targets.

Figure 4:
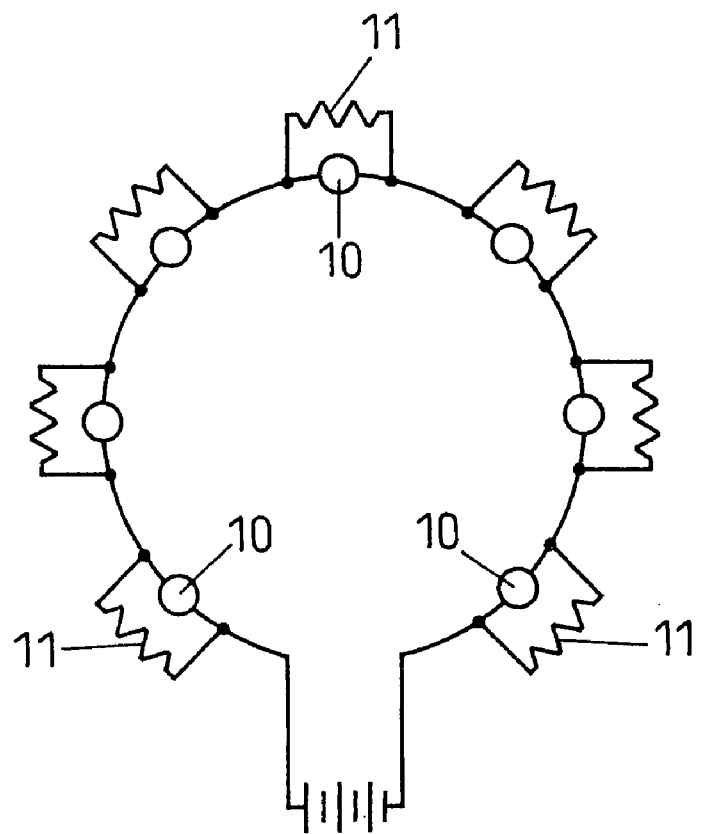
FIG. 4 shows an example of an arrangement of active targets encoding the identity of a measuring point substantially in the same way as the pattern according to FIG. 3.

FIG. 4 shows a further exemplified embodiment of a target arrangement to be used in the inventive measuring point identification method. This target arrangement comprises light emitting diodes 10 arranged in a ring and wired in parallel with resistors 11 of differing size. Application of three different resistor types results in three different intensities of light emission by the diodes. Use of the arrangement as shown in FIG. 4 can achieve the same effect as the arrangement shown in FIG. 3.

The invention claimed is:

1. A method for identification of measuring points in an optical measuring system in which system an arrangement of a plurality of active targets is used for marking each one of the measuring points, each of said targets having a different intensity and wherein, for identification of the measuring points, the intensities of the active targets (4, 10) are registered.

2. The method according to claim 1, wherein the targets (4, 10) are imaged in pixel images (1) and wherein intensities and/or sizes of the pixel images (1) are determined by summing-up intensities ($I_i$) sensed by pixels ($P_i$) comprised in the image (1) of a target, by counting the pixels ($P_i$) comprised in the image (1) of a target or by determining a maximum intensity ($I_M$) sensed by one of the pixels ($P_M$) comprised in the image (1) of a target.

3. The method according to claim 1, wherein the targets (10) are light emitting means emitting differing amounts of light energy.

4. An optical measuring system comprising:
a set of arrangements of a plurality of active targets (4, 10) each arrangement serving for identifying one measuring point in an optical measuring system, wherein the targets (4, 10) of each arrangement are arranged in a same pattern (3) or in differing patterns and wherein the targets (4, 10) have differing intensities; and
sensor means being equipped for determining intensity of the targets in the target arrangements.

5. The optical measuring system according to claim 4, wherein the target pattern (3) is a circle.

6. The optical measuring system according to claim 4, wherein the targets (10) are light emitting means emitting differing amounts of light energy.

7. A method for identification of measuring points in an optical measuring system in which system an arrangement of a plurality of active targets is used for marking each one of the measuring points, wherein each arrangement is different from the other arrangements by different target intensities and wherein, for identification of the measuring points, the target intensities in each arrangement are registered.

8. The method according to claim 7, wherein the targets (4, 10) are imaged in pixel images (1) and wherein intensities and/or sizes of the pixel images (1) are determined by summing-up intensities ($I_i$) sensed by pixels ($P_i$) comprised in the image (1) of a target, by counting the pixels ($P_i$) comprised in the image (1) of a target or by determining a maximum intensity ($I_M$) sensed by one of the pixels ($P_M$) comprised in the image (1) of a target.

9. The method according to claim 7, wherein the targets (10) are light emitting means emitting differing amounts of light energy.

10. The method according to claim 7, wherein a plurality of targets (4, 10) are associated with each measuring point, the plurality of targets (4, 10) being arranged in a predetermined pattern (3) and the measuring point identity is encoded by specific intensities of the targets (4, 10) in the pattern (3).

11. The method according to claim 7, wherein, for computing a spatial position and/or orientation of a measuring point, a spatial position of the targets (4, 10) in the target pattern (3) associated with the measuring point are determined.

* * * * *